United States Patent
Berzon

(10) Patent No.: US 8,048,974 B2
(45) Date of Patent: Nov. 1, 2011

(54) INITIATORS FOR OPTICAL COATING FORMULATIONS WITH REDUCED YELLOWNESS

(75) Inventor: Ronald Berzon, Saint Petersburg, FL (US)

(73) Assignee: Essilor International (Compagnie Generale d'Optique, Charenton (FR)

( * ) Notice: Subject to any disclaimer, the term of this patent is extended or adjusted under 35 U.S.C. 154(b) by 633 days.

(21) Appl. No.: 12/142,452

(22) Filed: Jun. 19, 2008

(65) Prior Publication Data
US 2009/0318619 A1    Dec. 24, 2009

(51) Int. Cl.
*C08F 4/34* (2006.01)

(52) U.S. Cl. ....... 526/230.5; 526/90; 526/227; 525/452; 525/455; 252/582; 252/600

(58) Field of Classification Search ................... 427/162; 525/452, 455; 252/582, 600; 526/90, 227, 526/230.5
See application file for complete search history.

(56) References Cited

U.S. PATENT DOCUMENTS

| 5,619,288 A * | 4/1997 | White et al. ................... 351/159 |
| 6,639,039 B1 | 10/2003 | Fries et al. |
| 7,820,081 B2 * | 10/2010 | Chiu et al. ..................... 264/1.7 |
| 7,820,082 B2 * | 10/2010 | Berzon et al. .................. 264/1.8 |
| 2007/0138664 A1 | 6/2007 | Chen et al. |
| 2007/0138665 A1 | 6/2007 | Chen et al. |
| 2007/0138667 A1 | 6/2007 | Dang et al. |
| 2008/0023138 A1 | 1/2008 | Zheng |

FOREIGN PATENT DOCUMENTS

DE    198 05 977 A1    8/1999

OTHER PUBLICATIONS

Arkema's Organic Peroxides Product Bulletin (available online at http://www.arkema-inc.com/literature/pdf/301.pdf on Mar. 21, 2006), pp. 1-7.*

* cited by examiner

*Primary Examiner* — David W Wu
*Assistant Examiner* — Vu A Nguyen
(74) *Attorney, Agent, or Firm* — Kausey & Associates, P.C.

(57) ABSTRACT

The invention relates to a acrylated-based optical coating composition containing an organic peroxide initiator which presents a low yellowness level. The initiator has a range of free radical energy that is below a predetermined level. The cure process is controlled by the use a catalyst and a low energy initiator to avoid deleterious reactions that can increase yellowness. The composition is well suited to be applied to a lens and cured in the mold to form a coating with reduced yellowness having high adhesion and abrasion-resistant properties. A dye can be introduced into the composition to form a tinted lens.

15 Claims, 1 Drawing Sheet

INITIATORS FOR OPTICAL COATING FORMULATIONS WITH REDUCED YELLOWNESS

BACKGROUND OF THE INVENTION

1. Field of the Invention

The invention relates to an acrylate-based optical coating composition comprising an organic peroxide initiator which presents a low yellowness level. More particularly, the composition is applied to a lens and cured in the mold to form a coating with reduced yellowness having high adhesion, abrasion-resistant, or photochromic properties.

2. The Prior Art

Injection molded polycarbonate ophthalmic lenses are lightweight and possess excellent mechanical properties. Photochromic dyes are incorporated into certain lenses to enhance their optical properties by automatically lightening or darkening based on the amount and type of light that they receive. Since the photochromic dye molecules can decompose when exposed to the heat of the injection molding process, such dyes need to be introduced on to the lens after the injection molding step. One method is to incorporate the photochromic dye into a coating composition and apply it to a lens surface via dip coating or spin coating. The surface discontinuity of bifocal and trifocal segmented lenses are not well suited to these typical coating processes. The viscous coating material builds-up at the segment which results in an undesirable darker color at the segment when exposed to UV light. A prior art process utilizing a photochromic polyurethane coating is shown in U.S. Pat. Nos. 6,187,444 and 7,258,437. These approaches do not use organic peroxides in the coating compositions, rather they utilize condensation reactions.

Photochromic (PhCh) Semi-finished Straight-Top (SFST) lenses can be made by injection molding polycarbonate (PC) behind a photochromic wafer. The wafer can be a tri-layer of PC/PhCh/PC. VisionEase U.S. Pat. No. 7,036,932 and U.S. Published Patent Application 2007/0122626 describes such a product.

Another method is to over-mold a photochromic coating onto a clear substrate or a clear coating onto a photochromic substrate. In one example, U.S. Pat. No. 6,863,844 describes a composite lens utilizing an acrylic photochromic monomeric solution and curing it by UV. These UV cure processes describe using UV radiation wavelength outside the absorption of the photochromic or employ filters to minimize UV absorption. This helps to protect the photochromic and ensure a good cure. In another example, U.S. Pat. No. 7,258,437 describes over-molding a non-photochromic polyurethane-acrylic solution on top of a photochromic polyurethane coated substrate by UV.

Some general photochromic acrylic coatings are cured as described in U.S. Pat. No. 6,602,603 utilizing UV initiators and azo initiators. The photochromic coatings utilizing the azo thermal initiator was cured in a vacuum oven, flushed with nitrogen and cured by IR for 4 minutes reaching a maximum temperature of 124° C. U.S. Pat. No. 5,621,017 describes the UV cure of an acrylic photochromic composition.

Other such photochromic coatings are Aminoplast melamine PhCh coatings, mentioned in U.S. Pat. Nos. 6,506,488 and 6,432,544. Thermal initiators are used to prepare polymers, while acid catalysts (eg. p-TSA) cure the photochromic Cymel resin mixture. A photochromic epoxy coating is described in U.S. Pat. No. 6,268,055. Thermal initiators are only used to prepare the polymers, no peroxide initiator is used to cure the epoxy PhCh coating.

Yet another method is proposed in U.S. Published Patent Application 2007/0138665 where a thermoplastic segmented lens substrate is injection molded. The mold block opens and a coating liquid is applied to the front surface of the segmented thermoplastic lens. The mold block then closes. This serves two (2) purposes. First, when the mold block closes, it spreads the coating over the front (CX) surface of the segmented thermoplastic lens to provide a uniform thickness. Secondly, the mold block will provide suitable heat to cure the coating formulation. A thermal initiator (t-butylperbenzoate) and a catalyst (cobalt naphthenate) are utilized to ensure a good cure. When the coating is a photochromic coating, the organic peroxide thermal initiator (t-butylperoxybenzoate) appears to damages the photochromic molecules resulting in a visible yellow color. Accordingly, there is a need to produce coatings with low yellow color. More particularly, it would be desirable to provide a photochromic coating composition with reduced yellowness, and a method for in-mold coating, especially for coating bifocal or trifocal segmented lenses.

SUMMARY OF THE INVENTION

It is therefore an object of the invention to provide a coating composition and in-mold coating process that provides a cured coating with low yellowness.

It is a further object to control the curing process to minimize molecular degradation through careful selection of an organic peroxide initiator.

It is another object to provide a photochromic coating composition in which the photochromic molecules remain intact and are not damaged during the curing process.

It is yet a further object to identify a range of radical energy levels associated with the initiators that achieves a fast cure times without negatively interacting with other compounds.

It is another object of the invention to specify organic peroxide initiators having a radical energy level below about 113 kcal/mol.

These and other related objects are achieved according to an embodiment of the invention relating to a method for optically coating an injection molded thermoplastic lens that resides in an injection molding machine. The first step is to formulate an acrylate-based coating composition which contains an organic peroxide initiator having a radical energy level below a predetermined level. To begin the lens molding cycle, molten thermoplastic resin is injected into an edge-gated lens-forming cavity of an injection molding machine having a vertical equipment axis to provide a lens substrate. The mold is opened at a time when the lens is rigid enough to retain its shape. The coating composition is applied onto the lens substrate. The mold is closed to spread the composition into a uniformly thin layer so that residual heat from the molding machine cures the composition into a coating with reduced yellowing.

The coating composition includes a metal catalyst in combination with the initiator to accelerate the cure. The organic peroxide has a limited radical energy level to avoid deleterious interactions that lead to increased yellowness. The organic peroxide radical energy is less than about 113 kcal/mol at 298 K. The initiator is preferably t-amylperoxy-2-ethylhexylcarbonate or t-butylperoxy-2-ethylhexylcarbonate. The initiator is preferably present in an amount from 1.0 phm to 5.0 phm. The coating composition may include a cosmetic dye, a tint dye, a photochromic dye, a dichroic dye or combinations thereof.

The injecting step provides an afocal lens substrate, a single vision lens substrate, a multifocal lens, a bifocal lens substrate, a bifocal straight-top lens substrate, a trifocal lens substrate, a trifocal straight-top lens substrate, or a progressive lens substrate.

The coating composition includes a peroxyester organic peroxide initiator which presents a free radical energy less than about 113 kcal/mol at 298 degrees K and a photochromic dye, and wherein the composition is applied to a polycarbonate lens surface having a discontinuity. The formulating step includes dissolving a metal salt in a solvent blend comprising: (1) a monofunctional (meth)acrylate; (2) a multifunctional (meth)acrylate; (3) a difunctional meth(acrylate); (4) an aliphatic urethane diacrylate; and adding an initiator selected from organic peroxides which presents a free radical energy less than about 113 kcal/mol at 298 K.

Another embodiment of the invention relates to a thermoset composition comprising: (1) at least one monofunctional (meth)acrylate; (2) at least one multifunctional (meth)acrylate; (3) at least one difunctional meth(acrylate); (4) at least one aliphatic urethane diacrylate; (5) at least one metal salt; and (6) at least one initiator comprising an organic peroxide which presents a free radical energy less than about 113 kcal/mol at 298 K.

The thermoset composition may include a cosmetic dye, a tint dye, a photochromic dye, a dichroic dye and combinations thereof. The outermost composition may include a thermoplastic polyurethane (TPU). The monofunctional (meth)acrylate is selected from the group consisting of isobornyl acrylate, isobornyl (meth)acrylate, methyl methacrylate, benzyl methacrylate, benzyl acrylate hydroxypropyl methacrylate, hydroxypropyl acrylate, 2-phenoxyethyl methacrylate, 2-phenoxyethyl acrylate and combinations thereof. The monofunctional (meth)acrylate is preferably benzyl acrylate. The multifuctional (meth)acrylate is selected from the group consisting of dipentaerythritol hexaacrylate, dipentaerythritol pentaacrylate, hexafunctional aliphatic urethane acrylate, and combinations thereof. The multifunctional (meth)acrylate is preferably dipentaerythitol pentaacrylate. The difunctional (meth)acrylate is selected from the group consisting of 1,6-hexanediol diacrylate, ethoxylated bisphenol A di(meth)acrylate, polyethylene glycol di(meth)acrylate and combinations thereof. The metal salt is preferably cobalt naphthenate. The initiator is preferably t-amylperoxy-2-ethylhexylcarbonate or t-butylperoxy-2-ethylhexylcarbonate.

The composition preferably includes (1) said at least one monofunctional (meth)acrylate being present in an amount from 5% to 40% by weight, more preferably 10 to 20% by weight; (2) said at least one multifunctional (meth)acrylate being present in an amount from 5% to 50% by weight, more preferably 10 to 35% by weight; (3) said difunctional meth(acrylate) being present in an amount from 5% to 50% by weight, more preferably 10 to 35% by weight; (4) said aliphatic urethane diacrylate being present in an amount from 5% to 70% by weight, more preferably 25 to 60% by weight; (5) said at least one metal salt being present in an amount from 0.05 to 2.0 parts per hundred monomer (phm), more preferably 0.25phm; and (6) said initiator being present in an amount from 0.1 to 5.0 phm, more preferably 1.5 phm. The thermoplastic polyurethane (TPU) is preferably present in an amount from 0.5 phm to 5.0 phm. The dye being present in an amount comprised from 0.1% to 5.0% by weight.

BRIEF DESCRIPTION OF THE DRAWING

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

Figure 1:
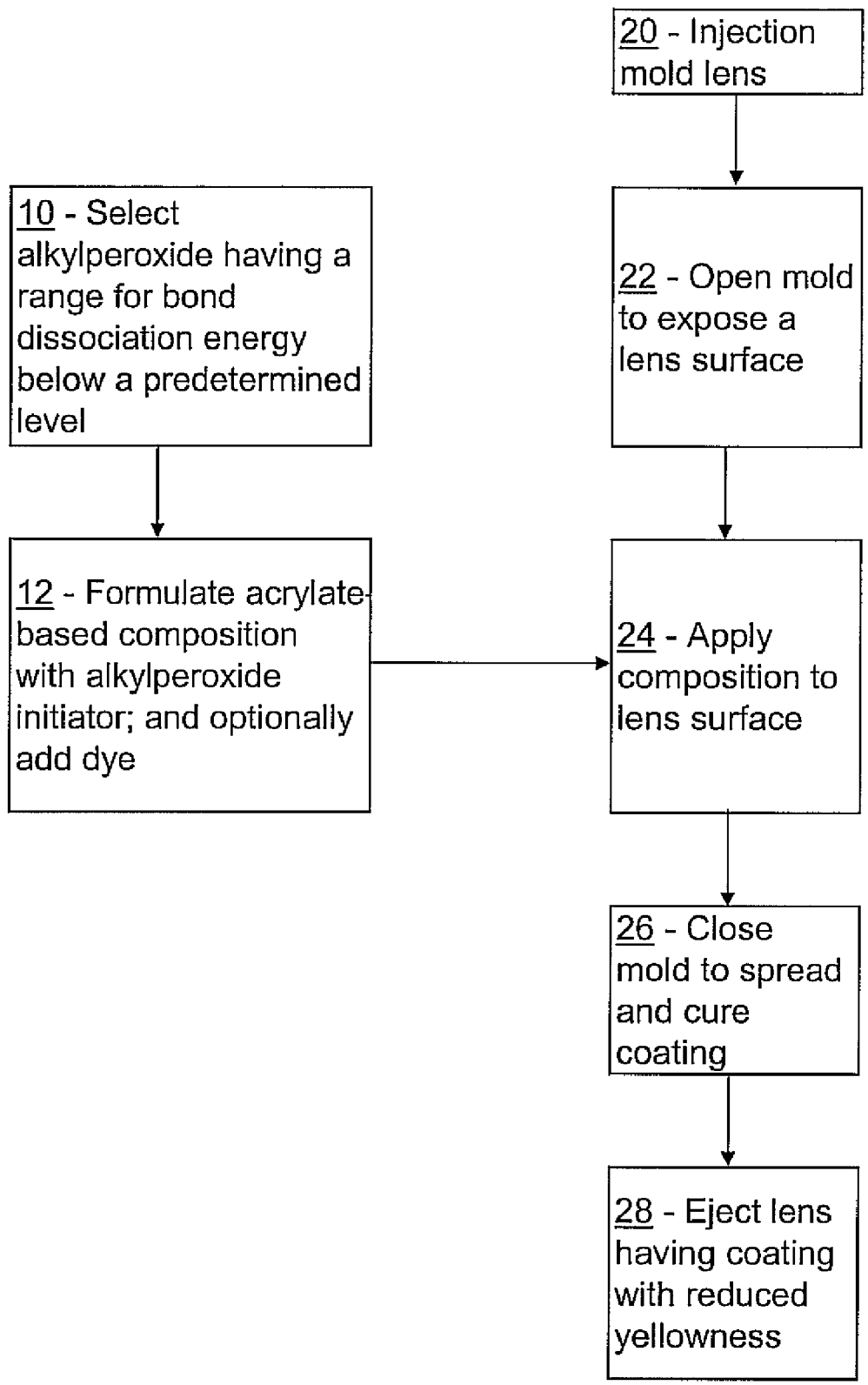
FIG. 1 is a flowchart showing various steps according to an embodiment of the coating method according to the invention.

Thermoplastic lenses must be extremely clean before they can be coated. In the regular lens coating process, after the lenses are taken out of mold and degated, they have to be transferred and go through several different cleaning tanks before being coated. The coatings often require heat or UV light in order to cure. The transfer, cleaning, coating and curing operations utilize vast amounts of space and have high power demands to operate conveyors, pumps, heaters and curing ovens. That adds to the cost of the finished product. Accordingly, it would be desirable to coat a lens soon after it is formed by injection molding. In contrast to the prior art, a lens can be coated in-mold within 1 or 2 minutes of initial environmental contact before ejection or degating, thereby eliminating those operations as contamination sources.

An embodiment of the lens coating process according to the invention will be characterized by the following steps. In the cooling stage of the lens molding, the mold will open for coating deposition. The mold can open as soon as the lens substrate is rigid enough to sustain mold opening. That is, the lens shape which determines the degree of aberration and power, will resist deformation under mold depressurization and vacuum forces. The coating is deposited as an unpressurized coating solution onto the lens substrate. The mold is reclamped to contact the coating with the upper mold insert and spread an even layer over the lens surface. The coating spread pressure is directed in exactly the same direction and manner as the lens forming clamp pressure. Once closed the coating is heated from below by the lens substrate, and from above by the mold insert. A 1-5 minute coating cure phase is provided while the lens achieves sufficient solidification to be ejected from injection molding machine.

As can be seen in the flowchart of FIG. 1, the left column relates to formulating the coating composition, which will be discussed in greater detail below. The right column relates to steps performed by, or with, the injection molding machine. The process is commenced with the closing of the mold, injecting resin in step 20 to provide a lens substrate, and optionally applying packing pressure. During this injection stage, a primary clamp force, of about 100 tons or more is utilized. Once the lens is rigid enough to sustain mold opening, the mold is opened, in step 22. Mold opening constitutes an upward vertical retraction of the movable side of the mold. This initial phase is conventional for injection molded lenses, for example, as described in U.S. Published Patent Application 2007/0138665. The substrate that could be used in this method could be any injection moldable lens material like PMMA, polycarbonate, polycarbonate/polyester blend, polyamide, polyurethane, polysulfone, cyclic olefin co-polymers, polystyrene, etc. In a preferred embodiment the substrate is polycarbonate.

One lens surface, for example the convex side, is exposed and facing upward. In step 24, the coating composition is applied to the exposed lens surface. The composition may be applied in a single, unpressurized charge, for example by a metering syringe mounted on a retractable arm that moves in between the open mold blocks. For lenses of all powers and configurations, the coating may be applied onto, or near, the center of the lens, off-center or at various locations. The lenses will all generally have a circular outer perimeter. One or more syringes may be employed to deposit coating composition, if the mold has 2, 4, or more lens molding cavities. After application of the composition and removal of tie syringe, the movable mold half closes in step 26 to spread the coating across the entire upper lens surface. The coating is spread radially outwardly from the center, or near the center, of the lens, out to the circular periphery. During this cure stage, a secondary clamp force, less than or equal to the primary clamp force may be utilized. After the coating is cured, and the lens has solidified sufficiently, the mold is opened and the cured coated lens is ejected in step 28.

peroxide is stable at room temperature, it prefers to exist as the peroxide molecule. A peroxide that is refrigerated prefers to decompose to the radical, the radical is the lower energy state.

As the bond dissociation energy decreases, the radical stability increases. To abstract a hydrogen from a benzene molecule would require 113.1 Kcal/mol. The radical is highly energetic and unstable. Whereas to abstract a hydrogen from a t-butyl molecule is much lower at 96+6 Kcal/mol, so the radical has less energy (softer) and it is more likely to be able to abstract this hydrogen. A list of Relative Radical Stabilities is shown in Table 1, in which certain values are cited from the *Handbook of Chemistry & Physics,* $81^{st}$ Ed. or were provided by Arkema Inc.

TABLE 1

| Structure | Bond Dissociation Energy (kcal/mole) at 298 K | Radical | |
|---|---|---|---|
| H—$C_6H_5$ | 113.1 | phenyl | |
| H—$O(CO)C_6H_5$ | 106.1 | benzoyloxy | Decreasing radical energy |
| H—$(CO_2)O$—EH-2 | ~106 | 2-EHOCO2 | |
| H—$OC(CH_3)_3$ | 105.1 | t-butoxy | |
| H—$CH_3$ | 104.9 | methyl | |
| H—O—EH-2 | ~104.9 | 2-EHO | |
| H—$OC_2H_5$ | 104.6 | ethoxy | |
| H—$OCH_3$ | 104.2 | methoxy | |
| H—$OCH_2C(CH_3)_3$ | 102.3 | t-amyloxy | |
| H—$CH_2CH_3$ | 101.1 | ethyl | |
| H—$CH_2C(CH_3)_3$ | 99.9 | t-amyl | |
| H—$C(CH_3)_3$ | 96.6 | t-butyl | |
| H—$OCC_6H_5$ | 87 | benzoyl | |
| H—$OC_6H_5$ | 86.4 | phenoxy | ↓ |

Our proposed solution is to utilize the above noted process with a coating composition containing a dye(s) and an organic peroxide and a metal catalyst. A thermal initiator will be chosen that provides a tinted coating with minimal yellow color, and wherein the tint could be chosen from cosmetic dyes, tint dyes, photochromic dyes, dichroic dyes and combination thereof. More specifically, per step 10, the initiator is an organic peroxide class material having a radical energy that is lower than about 113 kcal/mol at 298 degrees K. The coating composition is formulated in step 12 and may optionally contain an optical dye. Such a composition produces, after ejection from the injection molding machine, a semi-finished lens wherein the convex side is provided with a coating without a yellow color defect. A complete description of the composition components and examples of particular coating formulations will now be presented.

Organic peroxides are known initiators for acrylic monomers. Initiators contain one or more labile bonds that cleave homolytically when sufficient energy is supplied to the molecule. The energy must be greater than the bond dissociation energy (BDE) of the labile bond, as described in the *Kirk-Othmer Encyclopedia of Chemical Technology*. Energetic free radicals are formed during thermal decomposition of the organic peroxide. Metal catalysts such as cobalt naphthenate are known accelerators that will speed up the cure or ensure a more efficient conversion of monomer to polymer. These energetic free radicals are known to abstract hydrogen, attack unsaturations or interact with stabilizers. Other times, it is desirable to avoid attack to additives such as photochromic materials.

The thermal decomposition or thermolysis mechanism for a particular peroxide depends upon the molecular structure, primarily electronic and steric effects. The radical's ability to exist is based on its stability as a radical. For example, if the Table 1 is organized to show increasing radical stability (decreasing radical energy) as one moves down the listing. The thermal decomposition of some initiators used are shown.

Luperox P: (t-butylperoxybenzoate)

T-butylperoxybenzoate (Luperox P) thermal decomposition is described in the Arkema Peroxyesters Product Bulletin as among the commercial peroxyesters of peroxybenzoic acids to decompose by a mechanism that initially gives acyloxy and alkoxy radicals, after which decarboxylation or β-scission often occurs. T-butylperoxybenzoate decomposes into a benzoyloxy radical and a t-butoxy radical.

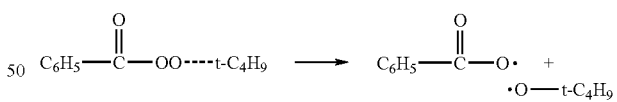

The benzoyloxy can further decarboxylate kinetically to a higher energy phenyl radical (113.2 Kcal/mol) and carbon dioxide.

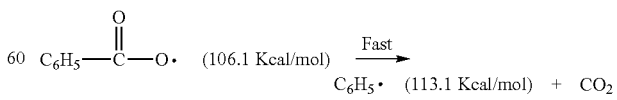

While the t-butoxy radical (105.1 Kcal/mol) may further decompose by β-scission to a methyl radical (104.9 Kcal/mol), it would be a very slow reaction as the driving force is low with ΔH=0.2 Kcal/mol.

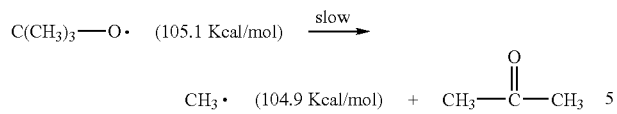

Luperox TAEC: OO-t-amyl-O-(2-ethylhexyl)monoperoxycarbonate (t-amylperoxy-2-ethylhexylcarbonate)

OO-t-amyl-O-(2-ethylhexyl)monoperoxycarbonate (Luperox TAEC) thermally decomposes into a t-amyloxy radical and a 2-ethylhexyloxycarbonate (2-EHOCO2) radical.

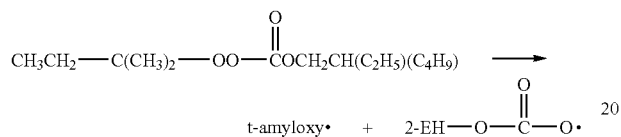

After the oxygen-oxygen bond cleavage, the t-amyloxy radical (102.3 Kcal/mol) can further decompose by β-scission to the ethyl radical (101.1 Kcal/mol) which is fast as $\Delta H=1.2$ Kcal/mol.

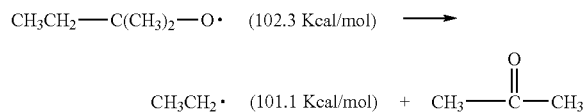

The 2-ethylhexyloxycarbonate (2-EHOCO2) radical can decarboxylate to a 2-ethylhexyloxy (2-EHO) radical which is fast as $\Delta H=1.1$ Kcal/mol.

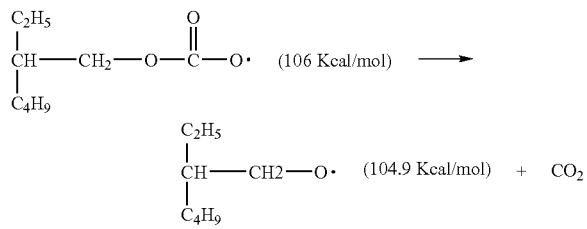

Luperox TBEC: OO-t-butyl-O-(2-ethylhexyl)monoperoxycarbonate(t-butylperoxy-2-ethylhexylcarbonate)

OO-t-butyl-O-(2-ethylhexyl)monoperoxycarbonate (Luperox TBEC) thermally decomposes into
a t-butoxy radical and a 2-ethylhexyloxycarbonate (2-EHOCO2) radical.

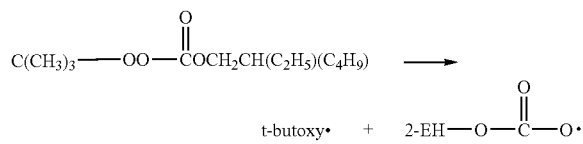

As described in the decomposition products of Luperox P, after the oxygen-oxygen bond cleavage, the t-butoxy radical (105.1 Kcal/mol) can further decompose by β-scission to the methyl radical (104.9 Kcal/mol) but this is a fairly slow or unlikely reaction as $\Delta H$-0.2 Kcal/mol.

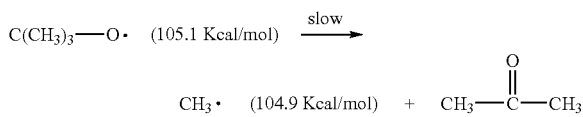

As described for Luperox TAEC, the 2-ethylhexyloxycarbonate (2-EHOCO2) radical can decarboxylate to a 2-ethylhexyloxy (2-EHO) radical which is fast with $\Delta H=1.1$ Kcal/mol.

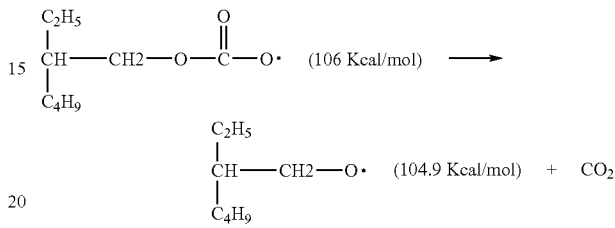

Surprisingly, it was found that polymerization of a photochromic acrylic coating can be achieved with low yellow color. A basic photochromic formulation is shown in Table 2.

TABLE 2

|  | Weight (g) |
| --- | --- |
| cobalt naphthenate (a) | 0.25 |
| photochromic (b) | 3 |
| benzyl acrylate (c) | 20 |
| Ebecryl 284N (d) | 20 |
| Ebecryl 1290 (e) | 30 |
| Ebecryl 8411 (f) | 30 |
| Organic peroxide (g) | 1.5 |

(a) Sigma-Aldrich
(b) combination of photochromic materials to give a gray color upon UV exposure
(c) Alfa-Aesar
(d) (e), (f) Cytec
(g) Arkema The components in Table 2 are combined and mixed thoroughly to yield a photochromic coating.

A coated lens was made by the process in which a thermoplastic segmented lens substrate is first injection molded. The thermoplastic is polycarbonate. The mold block opens and photochromic coating from Table 2 is applied to the front surface of the segmented polycarbonate lens. The mold block then closes which serves two (2) purposes. First, when the mold block closes, it spreads the coating over the front convex (CX) surface of die segmented polycarbonate lens to provide a uniform thickness. Secondly, the mold block will provide suitable heat to cure the photochromic coating from Table 2. The mold block remains in contact with the coating for 1-minute to produce a photochromic coated lens.

The photochromic lens was conditioned by exposure to UV to darken followed by a bleaching step in order to erase any exposure the photochromic may have seen previous to testing. The photochromic lenses were measured for color using a Perkin-Elmer Lambda 900 to provide b* (yellow). Surprisingly, the photochromic coatings that were initiated using Luperox TAEC and Luperox TBEC have lower b* yellow of 4.7 and 2.9 respectively as reported in Table 3. The photochromic coating initiated using Luperox P shows a higher b* yellow of 6.8. A value of less than 5 is desired and more so a value less than 4 is preferred. Lupersol P differs from TAEC or TBEC in that it thermally decomposes to a benzoyloxy (BO) radical (106 Kcal/mol) which further decomposes to a high energy phenyl radical (113.1 Kcal/mol) which are thought to attribute to the high yellow color. The possible radical species for each initiator are shown in Table 3 below, along with the b* yellow value corresponding to the photochromic coating.

TABLE 3

Free Radical Products

| Organic Peroxide | t-amyloxy | t-butoxy | BO | 2-EHOCO2 | methyl | ethyl | 2-EHO | Phenyl | b* yellow | Highest Energy radical (Kcal/m) |
|---|---|---|---|---|---|---|---|---|---|---|
| Luperox TAEC (b) | x | | | X | | x | x | | 4.7 | 106 |
| Luperox TBEC (a) | | x | | X | x | | x | | 2.9 | 106 |
| Luperox P (c) | | x | x | | | x | | X | 6.8 | 113.1 |

(a) Arkema OO-t-butyl-O-(2-ethylhexyl)monoperoxycarbonate
(b) Arkema OO-t-amyl-O-(2-ethylhexyl)monoperoxycarbonate
(c) Arkema t-butylperoxybenzoate The photochromic lens was measured on a BMP. Color and optical density are measured while UV light activates the photochromic over a 15 minutes time period. The light is shut off the photochromic bleaches and the color and optical density continue to be measured. We report the amount of light transmission after 15-minutes of UV exposure as % T dark 15 min. This tells us the relative darkening intensity. The rate at which darkening occurs is reported as T½ dark and the rate at which the photochromic bleaches is T½ fade.

Table 4 shows the photochromic performance T½ fade is significantly longer at 120 seconds using Luperox P.

TABLE 4

| Organic Peoxide | % T dark 15 min | T½ dark | T½ fade |
|---|---|---|---|
| Luperox TBEC (a) | 16 | 24 sec | 99 sec |
| Luperox TAEC (b) | 13 | 23 sec | 85 sec |
| Luperox P (c) | 14 | 29 sec | 122 sec |

(a) Arkema OO-t-butyl-O-(2-ethylhexyl)monoperoxycarbonate
(b) Arkema OO-t-amyl-O-(2-ethylhexyl)monoperoxycarbonate
(c) Arkema t-butylperoxybenzoate Another acrylic photochromic formulation is shown in Table 5. In this case, Akzo Triganox 131 t-amylperoxy-2-ethylhexylmonoperoxycarbonate (comparable to Luperox TAEC) was used.

TABLE 5

| | Weight (g) |
|---|---|
| cobalt naphthenate (a) | 0.25 |
| photochromic (b) | 3.0 |
| organic peroxide (c) | 1.5 |
| SR423A (d) | 1.0 |
| benzyl acrylate (e) | 19.0 |
| SR399LV (f) | 30 |
| CN965 (g) | 50 |
| Optional additives* | |
| Carbothane 3575A (h) | 1.0 |
| HALS (i) | 1.0 |

(a) Sigma-Aldrich
(b) photochromic materials chosen to give a gray color upon UV exposure
(c) Akzo: Triganox 131 t-amylperoxy-2-ethylhexylcarbonate
(d) Sartomer isobornyl methacrylate
(e) Sans Ester
(f) Sartomer dipentaerythritolpentaacrylate
(g) Sartomer aliphatic polyester urethane diacrylate
(h) Lubrizol Carbothane 3575A
(i) hindered amine light stabilizer
*Note those skilled in the art are familiar with the incorporation of additives. Such additives can be thermoplastic urethanes (TPU), hindered amine light stabilizers (HALS), antioxidants (AO), flow enhancing surfactants, leveling agents amongst others.

Table 6 shows Photochromic Coating Performance and includes b* at <4.0 using Triganox 131 with or without the inclusion of Carbothane 3575A TPU. The TPU can be dissolved into monomers to increase viscosity or provide other useful properties. Akzo Triganox 131 is chemically the same as Arkema Luperox TAEC.

TABLE 6

| Example | Carbothane 3575A | b* | 200 hr SunTest |
|---|---|---|---|
| 6a | none | 3.45 | Pass |
| 6b | 1 phm | 3.10 | Pass |

The SunTest is conducted by placing coated lenses into an Atlas Suntest CPS+ for 200 hours exposure and removed at predetermined intervals. Coating adhesion was tested by scoring the coating with a multi-razorblade device and then scoring again at 90 degrees. Tape was applied to the scored area and the tape was pulled. Adhesion passes if no coating is removed with the tape.

The above description provides general and specific guidelines for forming acrylate-based photochromic coating compositions. The compositions provide low yellowness coatings for thermoplastic lenses. They can be complemented with various dyes. A key component is the use of an organic peroxide having a free radical energy below 113 kcal/mol. For example, peroxyesters having free radical energy levels below 110 kcal/mol, or in a range from about 100 to 106 kcal/mol may be used. It was discovered that free radicals with too high of an energy level can cause the radicals to interact with other components in the composition. The result of such interactions was observed as unacceptably high yellowness. The discovery is of particular value in protecting photochromic dye molecules from being attacked or damaged. The discovery is also applicable in protecting all dyes molecules from being attacked or damaged by free radical having too high of an energy level. The composition is well suited for use in a post-injection coating process, where the mold is used to spread the composition into a uniformly thin layer across the convex surface of the lens. This process uses the residual heat from the molten thermoplastic and the mold to cure the composition into a solid, abrasion resistant coating. The in-mold process also allows the coating to achieve a high degree of conformity to the surface of bifocals, at the segment ridge. References to segmented lenses and multifocal lens means lenses having a ridge, which we also refer to as a lens surface discontinuity. These factors allow photochromic bifocal lens to be efficiently manufactured. Throughout the specification there are parenthetical references to (meth) acrylates. This notation refers to, and includes, the acrylate compound or the corresponding methacrylate version.

Having described preferred embodiments for lens manufacturing, materials used therein for coatings and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A thermoset composition comprising:
   (1) at least one monofunctional (meth)acrylate;
   (2) at least one multifunctional (meth)acrylate;
   (3) at least one difunctional meth(acrylate);
   (4) at least one aliphatic urethane diacrylate;
   (5) at least one metal salt; and
   (6) at least one initiator comprising an organic peroxide which presents a free radical energy less than about 113 kcal/mol at 298 K, wherein said initiator being selected from the group consisting of t-amylperoxy-2-ethylhexylcarbonate and t-butylperoxy-2-ethylhexylcarbonate.

2. A thermoset composition of claim 1, further comprising at least one dye selected from the group consisting of a cosmetic dye, tint dye, a photochromic dye, a dichroic dye and combinations thereof.

3. A thermoset composition of claim 1, further comprising one thermoplastic polyurethane (TPU).

4. The composition of claim 1, wherein the monofunctional (meth)acrylate is selected from the group consisting of isobornyl acrylate, isobornyl (meth)acrylate, methyl methacrylate, benzyl methacrylate, benzyl acrylate, hydroxypropyl methacrylate, hydroxypropyl acrylate, 2-phenoxyethyl methacrylate, 2-phenoxyethyl acrylate and combinations thereof.

5. The composition of claim 4, wherein the monofunctional (meth)acrylate is benzyl acrylate.

6. The composition of claim 1, wherein the multifunctional (meth)acrylate is selected from the group consisting of dipentaerythritol hexaacrylate, dipentaerythritol pentaacrylate, hexafunctional aliphatic urethane acrylate, and combinations thereof.

7. The composition of claim 6, wherein the multifunctional (meth)acrylate is dipentaerythritol pentaacrylate.

8. The composition of claim 1, wherein the difunctional (meth)acrylate is selected from the group consisting of 1,6-hexanediol diacrylate, ethoxylated bisphenol A di(meth)acrylate, polyethylene glycol di(meth)acrylate and combinations thereof.

9. The composition of claim 1, wherein the metal salt includes cobalt naphthenate.

10. The composition of claim 1, wherein the initiator has the highest free radical energy below about 106 kcal/mol at 298 K.

11. The composition of claim 1, further comprising:
    (1) said at least one monofunctional (meth)acrylate being present in an amount from 5% to 40% by weight;
    (2) said at least one multifunctional (meth)acrylate being present in an amount from 5% to 50% by weight;
    (3) said difunctional meth(acrylate) being present in an amount from 5% to 50% by weight;
    (4) said aliphatic urethane diacrylate being present in an amount from 5% to 70% by weight;
    (5) said at least one metal salt being present in an amount from 0.05 to 2.0 phm; and
    (6) said initiator being present in an amount from 0.1 to 5.0 parts per hundred monomer (phm).

12. A thermoset composition comprising:
    (1) at least one monofunctional (meth)acrylate;
    (2) at least one multifunctional (meth)acrylate;
    (3) at least one difunctional meth(acrylate);
    (4) at least one aliphatic urethane diacrylate;
    (5) at least one metal salt;
    (6) at least one initiator comprising an organic peroxide; and
    (7) a thermoplastic polyurethane (TPU) being present in an amount from 0.5 to 5.0 parts per hundred monomer (phm).

13. The composition of claim 2, further comprising said at least one dye being present in an amount comprised from 0.1% to 5.0% by weight.

14. The composition of claim 1, further comprising:
    (1) said at least one monofunctional (meth)acrylate being present in an amount from 10 to 20% by weight;
    (2) said at least one multifunctional (meth)acrylate being present in an amount from 10 to 35% by weight;
    (3) said difunctional meth(acrylate) being present in an amount from 10% to 35% by weight;
    (4) said aliphatic urethane diacrylate being present in an amount from 25% to 60% by weight;
    (5) said initiator being present in an amount of 1.5 parts per hundred monomer (phm); and
    (6) said at least one metal salt being present in an amount of 0.25 part per hundred monomer (phm).

15. The composition of claim 3, wherein the thermoplastic polyurethane (TPU) being present in an amount from 0.5 to 5.0 parts per hundred monomer (phm).

* * * * *